(12) United States Patent
Rosen et al.

(10) Patent No.: US 9,672,788 B2
(45) Date of Patent: Jun. 6, 2017

(54) REDUCING VISUAL CROWDING, INCREASING ATTENTION AND IMPROVING VISUAL SPAN

(71) Applicant: New York University, New York, NY (US)

(72) Inventors: Sarah Rosen, Hoboken, NJ (US); Denis G. Pelli, New York, NY (US)

(73) Assignee: NEW YORK UNIVERSITY, New York, NY (US)

( * ) Notice: Subject to any disclaimer, the term of this patent is extended or adjusted under 35 U.S.C. 154(b) by 79 days.

(21) Appl. No.: 14/352,869

(22) PCT Filed: Oct. 19, 2012

(86) PCT No.: PCT/US2012/061099
§ 371 (c)(1),
(2) Date: Apr. 18, 2014

(87) PCT Pub. No.: WO2013/059647
PCT Pub. Date: Apr. 25, 2013

(65) Prior Publication Data
US 2014/0247273 A1    Sep. 4, 2014

Related U.S. Application Data

(60) Provisional application No. 61/550,122, filed on Oct. 21, 2011.

(51) Int. Cl.
*G09G 5/02* (2006.01)
*G06K 9/00* (2006.01)
(Continued)

(52) U.S. Cl.
CPC .............. *G09G 5/02* (2013.01); *G06F 3/013* (2013.01); *G06K 9/0061* (2013.01); *G06T 7/73* (2017.01);
(Continued)

(58) Field of Classification Search
None
See application file for complete search history.

(56) References Cited

U.S. PATENT DOCUMENTS

| | | |
|---|---|---|
| 5,731,805 A | 3/1998 | Tognazzini et al. |
| 5,802,533 A | 9/1998 | Walker |

(Continued)

FOREIGN PATENT DOCUMENTS

| | | |
|---|---|---|
| JP | 2010-0258940 | 11/2010 |
| KR | 10-2009-0127779 | 12/2009 |

OTHER PUBLICATIONS

Kwon, Miyoung, Gordon E. Legge, and Brock R. Dubbels., "Developmental changes in the visual span for reading." Journal of Vision 5.8 (2005): 807-807 ("Kwon").*

(Continued)

*Primary Examiner* — Mark Zimmerman
*Assistant Examiner* — Sarah Le
(74) *Attorney, Agent, or Firm* — Foley & Lardner LLP

(57) ABSTRACT

Methods, systems, and apparatuses, including computer programs encoded on computer readable media, for modifying displayed text in a gaze-contingent way to reduce crowding, thus increasing the observer's visual span, and thus increasing the observer's reading rate. The trick is to introduce only a few differences between characters (not enough to produce a pattern) of text so as to reduce crowding. For example, differences between characters near the left and right extremes of the observer's estimated visual span can be altered to reduce crowding.

17 Claims, 10 Drawing Sheets

(51) Int. Cl.
*G09G 5/26* (2006.01)
*G06F 3/01* (2006.01)
*G06T 7/73* (2017.01)
*G06F 17/21* (2006.01)

(52) U.S. Cl.
CPC ............ *G09G 5/26* (2013.01); *G06F 17/214* (2013.01); *G06T 2207/10048* (2013.01); *G09G 2320/0666* (2013.01); *G09G 2354/00* (2013.01)

(56) References Cited

U.S. PATENT DOCUMENTS

| 2008/0222518 | A1 | 9/2008 | Walker | |
|---|---|---|---|---|
| 2009/0172524 | A1* | 7/2009 | Sorenson | G06F 17/24 715/269 |
| 2009/0309892 | A1* | 12/2009 | Uehori | G09G 5/346 345/581 |
| 2011/0254865 | A1* | 10/2011 | Yee | G06F 3/013 345/661 |

OTHER PUBLICATIONS

Yu, Deyue, et al., "Effect of letter spacing on visual span and reading speed." Journal of Vision 7.2 (2007): 2.*
Bernard, Jean-Baptiste, et al., "Navisio: Towards an integrated reading aid system for low vision patients." Workshop on Computer Vision Applications for the Visually Impaired. 2008.*
Notification of Transmittal of the International Search Report and the Written Opinion for PCT/US2012/061099, dated Mar. 29, 2013, 10 pages.
International Preliminary Report on Patentability for PCT/US2012/061009, dated Apr. 22, 2014, 6 pages.

* cited by examiner

REDUCING VISUAL CROWDING, INCREASING ATTENTION AND IMPROVING VISUAL SPAN

CROSS REFERENCE TO RELATED APPLICATIONS

The present application is a U.S. national stage application claiming the benefit of International Application No. PCT/US2012/061099, filed on Oct. 19, 2012, which claims priority from U.S. Provisional Application No. 61/550,122, filed Oct. 21, 2011, the entire contents of which are incorporated herein by reference in their entirety.

GOVERNMENT RIGHTS

This invention was made with government support under Grant No. R01 EY04432 awarded by the National Institutes of Health. The government has certain rights in the invention.

BACKGROUND

Most people have the impression that they read by gliding their gaze across the page. However, in fact, it has been known since around 1900 that we read by taking 0.2 second static glimpses (fixations) separated by quick jerks (saccades). The brain integrates the information from the glimpses over time to create the illusion of taking it all in at once, as we glide across the page.

The visual span, or the uncrowded window, is the number of characters that the observer can take in without moving his eyes. This limits how much the observer can perceive during each fixation. Letters beyond the visual span are too crowded to be recognized. Each successive glimpse advances to the right by about one visual span. Reading speed is equal to the product of saccade rate and saccade size. The saccade rate is about four per second for most readers across a wide range of conditions. The saccade size is approximately the visual span. This suggests that increasing the visual span would increase reading speed, by the same proportion. However, conjectured methods for increasing the visual span depend on assumed the theory for what limits the visual span.

An object that is surrounded by other objects (clutter) may be hard to identify. One sees only a jumble. This is crowding. Acuity sets a minimum letter size. Crowding sets a minimum letter spacing. Like acuity, crowding gets worse with increasing eccentricity. The maverick theory is that visual span is limited by crowding (i.e. required letter spacing) not acuity (i.e. required letter size). The required letter spacing is negligible at fixation and grows in proportion to distance from fixation. For uniformly spaced text, the letters near fixation will be far enough apart to be read. Letters too far from fixation will be spaced less than the critical spacing apart and will not be readable. The uncrowded window, centered on fixation, is the visual span. Reducing crowding may increase the visual span and speed up reading.

Most attempts to alleviate crowding rely on the fact that crowding depends on similarity. Increasing the difference between objects (in this case, letters) reduces crowding and increases saliency. For example, in a pair of letters, both black, on a blank field, the letters crowd each other, but in a different pair, one black and one white, the letters do not crowd each other, because of the color difference. However, in a line of many letters, alternately black and white, adjacent characters do crowd each other. This is because of grouping. Crowing is the result of grouping. In a pair of characters, the visual system groups letters of the same color together, so they crowd. An isolated unlike pair does not group and does not crowd. In the long line of alternating characters, the regular alternation of color is perceived as a pattern (stripes) that groups, so there is crowding. The trick to reduce grouping and crowding is to increase the differences without creating patterns. This also results in increasing saliency, which increases attention. Reduced crowding and increasing attention can increase the visual span and speed up reading.

SUMMARY

In general, one aspect of the subject matter described in this specification can be embodied in methods for capturing an image that includes a visual representation of at least one eye of an observer. A location of the eye(s) of the observer in the image is determined. A gaze location is determined based at least upon the location of the eyes in the image, wherein the gaze location identifies a location within displayed text. A nominal span is estimated. The nominal span comprises a plurality of characters, and the location of the nominal span is based upon the gaze location. One or more visual characteristics of the displayed text are altered based at least upon the nominal span. The alterations to the one or more visual characteristics of the displayed text reduce crowding so as to increase the visual span of an observer. Other implementations of this aspect include corresponding systems, apparatuses, and computer-readable media, configured to perform the actions of the method.

The foregoing summary is illustrative only and is not intended to be in any way limiting. In addition to the illustrative aspects, implementations, and features described above, further aspects, implementations, and features will become apparent by reference to the following drawings and the detailed description.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several implementations in accordance with the disclosure and are, therefore, not to be considered limiting of its scope, the disclosure will be described with additional specificity and detail through use of the accompanying drawings.

FIG. 3 illustrates unaltered characters of text.

FIG. 4 illustrates altering color of characters to reduce crowding and increase attention in accordance with an illustrative implementation.

Figure 1:
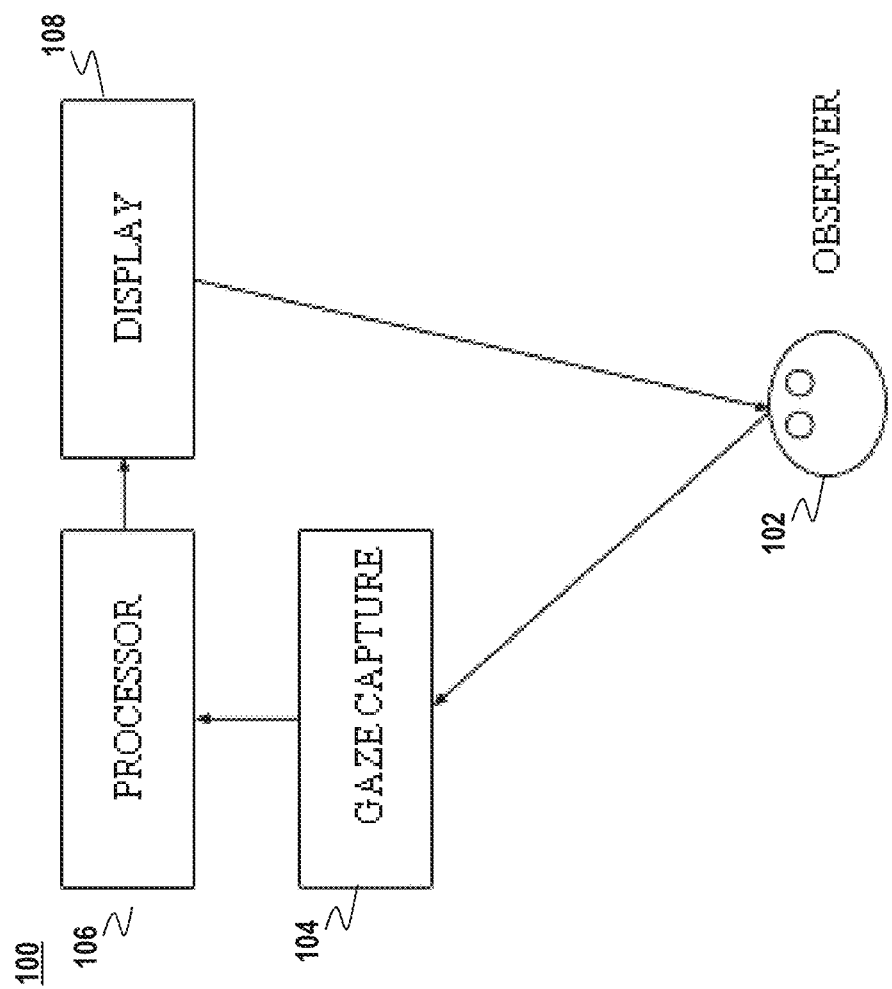
FIG. 1 illustrates a gaze contingent system for reducing crowding of text in accordance with an illustrative implementation.

Reference is made to the accompanying drawings throughout the following detailed description. In the drawings, similar symbols typically identify similar components, unless context dictates otherwise. The illustrative implementations described in the detailed description, drawings, and claims are not meant to be limiting. Other implementations may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and made part of this disclosure.

DETAILED DESCRIPTION

Increasing reading speed can be accomplished through increasing the visual span of a reader and/or increasing the attention of the reader. Changes to text that increase the difference between characters (thereby increasing saliency), without creating patterns, can increase the visual span. For example, alternating the color of characters along the whole line of text produces a perceptual pattern, which is grouped. One way to reduce crowding is to introduce differences between letters, without producing a perceptual pattern. In addition to reducing crowding, the changes can increase the attention of the reader.

The visual span can be increased by relieving the crowding of one or more characters in text. As the visual span is a physical property of an observer, an estimate of an observer's visual span is needed. A nominal span is a parameter in a model of the observer and is the assumed visual span of the observer for normal unaltered text. In one implementation, visual characteristics of the characters within and/or outside of the nominal span can be altered. For example, the characters immediately outside of the nominal span can be altered. In another embodiment, characters within the nominal span and the characters immediately outside of the nominal span can be altered. In yet another embodiment, characters outside of the nominal span can be altered. For example, characters outside of the nominal span that are not immediately outside of the nominal span can be altered.

The alteration of the text can reduce crowding of the characters beyond the nominal span, which can increase the visual span of the observer. For example, the altered characters can be a different color compared to the unaltered characters. The size of a normal visual span might be ten characters. In one implementation, characters to the left and to the right of the nominal span can be altered. In another implementation, the characters to the left and to the right of the nominal span and the characters within the nominal span can be altered. Altering text can result in reduced crowding in characters that are just beyond the observer's visual span. This increases the size of the observer's visual span. If the saccade rate is unchanged then reading speed will increase in proportion to the size of the increased visual span. Reducing crowding widens the visual span, which results in larger saccades (eye movements), since each glimpse takes in more letters through the increased visual span. This increases reading speed.

FIG. 1 illustrates a gaze contingent system for reducing crowding of text in accordance with an illustrative implementation. Text can be displayed on display 108. The text can include characters or other objects, such as but not limited to, images, symbols, etc. Each character has visual characteristics that can be used to display the character. For example, a character can have a size, a font, a font color, a background color, an orientation, a bold indicator, an italic indicator, an underline indicator, etc. A processor 106 can be used to determine how the characters of the text are to be displayed. The processor 106 can control or send information to the display 108 to have the text displayed based upon the visual characteristics of the characters.

The text can be displayed to an observer 102. The observer 102 looks at the display 108 to view the text. A gaze-capture component 104 determines where on the display 108 the observer 102 is looking. Gaze capture is known by those of skill in the art. For example, the gaze capture component 104 can include a camera. The camera can track a pupil location of an observer. In some implementations, the camera can be integrated into another device, such as, but not limited to, a computing device, a tablet computing device, a cell phone, a personal digital assistant, etc. In some implementations, a calibration routine can be used to calibrate a coordinate system displayed on a screen with the location of an observer's pupils. For example, a calibration routine can request that an observer look at each of the four corners of a display. The location of the observer's pupils at each corner can be used to calibrate a coordinate system associated with the screen. This coordinate system, in conjunction with the pupil location, can be used to calculate a gaze position of the observer. The gaze position indicates where an observer is looking on the screen. The camera can continually track the observer's pupils and calculate a gaze position.

In another implementation, the gaze capture component 104 can include near-infrared illuminators that can generate a corneal reflection from an observer. A camera can capture an image that includes the observer's eyes. The image of the eye can then be used to detect the position of the pupil and/or iris and identify the reflections from the illuminators. Based upon these data and/or the image, the location of the illuminators can be calculated. A mathematical model of the eye can be used to calculate the observer's eye's position in space and the gaze location. The gaze location can be calculated to a coordinate system corresponding to a screen based upon calibration data.

The gaze capture component 104 can provide gaze location information to the processor 106 regarding the location of the gaze of the observer 102. For example, the gaze capture component 104 can determine a position of an observer's eyes. The position of the observer's eyes can then be used to calculate a gaze position on a screen. For example, the gaze position can be an (x,y) coordinate of where on the screen the user is looking. In one implementation, only a single eye is required to be tracked. In this implementation, the gaze position can be calculated based on the determined position of the single eye. The gaze capture component 104 can continuously monitor an observer's gaze to determine where the observer is currently looking. Based upon this monitoring, visual characteristics of the characters within the text can be changed to increase the attention and the visual span of the observer.

Previously acquired gaze location information can be used to artificially represent the current eye position of the observer 102. For example, if the camera loses the tracking of the observer's eyes (for example due to a blink) the last reliable gaze location can be used to maintain text alterations until reliable tracking resumes. In another example, if the observer looks outside of a predetermined region, the last reliable gaze location within the predetermined region can be used to maintain text alterations until the observer's eyes return to the predetermined region. In another example, if the device is turned off, when it is turned back on, the stored gaze location information can be used to automatically alter the last previously viewed region, thereby directing the observer's attention to that location (acting as a bookmark).

In another implementation, there is no gaze capture component. Instead, the visual span moves at a predetermined rate over the text. This rate can be configurable by a user to approximate the user's reading speed. A user interface can provide a user with the ability to decrease and increase the reading speed or to gradually change speed over time. In addition, the user interface can allow the user to pause, fast forward, rewind, etc. in the text.

Figure 2:
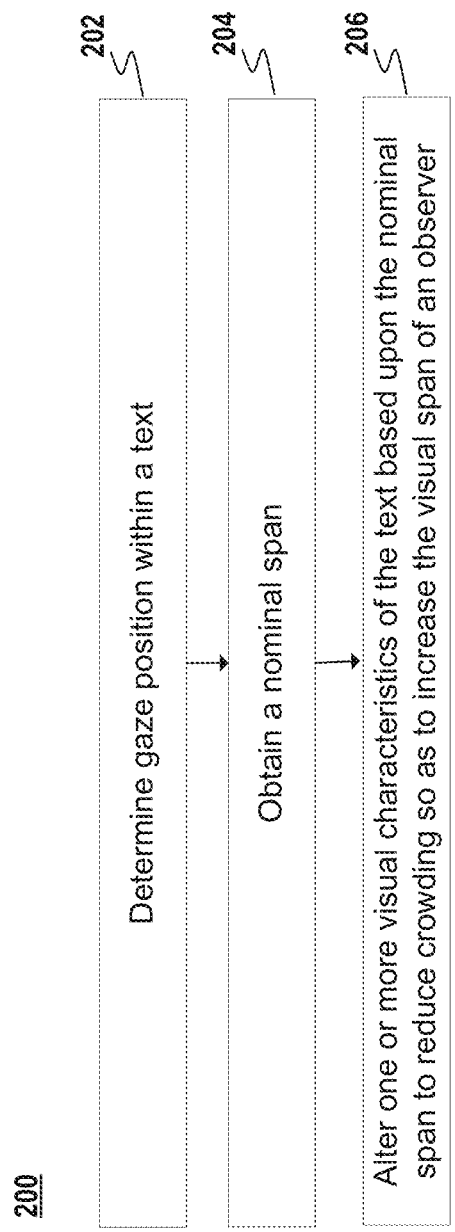
FIG. 2 illustrates a flow diagram of a process for reducing crowding of text in accordance with an illustrative implementation.

FIG. 2 illustrates a flow diagram of a process for reducing crowding of text in accordance with an illustrative implementation. The process 200 can be implemented on a computing device. In one implementation, the process 200 is encoded on a computer-readable medium that contains instructions that, when executed by a computing device, cause the computing device to perform operations of the process 200.

The process 200 includes determining a gaze location within a text that a observer is currently viewing based upon gaze location information (202). A nominal span can be obtained (204). In one implementation, the size of the nominal span of an observer can be determined by measuring the visual span of the observer. For example, an observer can fixate on a point on the screen and three characters can be flashed at varying distances from the fixation point. The observer can be asked to identify the middle letter as the triplet gets further from the fixation point. Eventually, the observer will not be able to identify the middle letter and the size of the visual span can be measured based upon the largest distance from the fixation point that the observer was able to identify the letter. Any other method for measuring visual span of an observer known in the art can also be used to measure the visual span size. In another implementation, the assumed nominal visual span size can be based upon an average visual span size of a population. For example, the initial visual span size can correspond to the average visual span size of literate adults. In one implementation, the nominal span size is ten characters, which corresponds to the number of characters a typical observer can process in a single fixation.

Visual span, whether measured directly, or assumed, can be set to intelligently change over time based on observer performance. Visual span size can be very small for observers who are unfamiliar with a particular display, but have an otherwise normal/large visual span. Examples include anyone learning to read (children or learners of foreign languages), anyone learning to view a new type of image display, and people with visual impairments. The span can be altered to isolate smaller units of the image. In one implementation, parts of a word can be isolated so that the span size varies depending on syllable length. For example, for the word "children," isolations can include "child" and "ren" and then the two units can be shown in conjunction to isolate the entire word "children."

Visual span can also be manipulated based on grammar. For example, though the visual span may be set to 10 characters, this number can be flexible and increase or decrease depending on word and grammar breaks. In one example, if a small word such as "the" appears immediately outside a set span size of 10 characters, it can be added to the span size to increase it to 13 characters. Span size can also be based on grammatical units so as to not break sentences between meaningful units.

The nominal span includes one or more characters of the text. Crowding within text can be reduced and saliency increased by altering visual characteristics of characters within the text. Reducing crowding can result in enlarging an observer's visual span (206) and increasing the attention to a particular portion of the text. In one implementation, one or more visual characteristics of a character to the left and a character to the right of the nominal span are altered. More characters can be altered, for example, more than two or more characters, a word, or one or more syllables, etc. to the left and right of the nominal span. In addition, in some implementations any partially altered word is completely altered. Any number of characters can be altered to reduce crowding an increase the visual span of an observer. For example, two, three, five, etc. characters can be altered that are to the left and right of the nominal span.

Any number or combination of changes to the visual characteristics of the characters of the text can be done to decrease crowding and increase saliency. Examples of altering visual characteristics of characters include, but are not limited to, changing the font, color, orientation, brightness, background color, size, and/or spacing. Various combinations of characters can have their visual characteristics altered. For example, in one implementation, characters immediately to the left and right of the nominal span are altered. In another implementation, characters immediately to the left and right of the nominal span and the characters within the nominal span are altered. In another embodiment, characters immediately to the left and right of the nominal span and the characters within the nominal span are altered. In addition, characters outside this region can also altered, although these characters are altered differently then those to the left and right of the nominal span and the characters within the nominal span. In some embodiments, the alterations to the text will not be uniform to all characters. For example, characters within the nominal span can be alerted differently from characters outside of the nominal span.

The text can also be altered based upon the location of the nominal span. For example, the line currently being read can have space added above and below the line. In one implementation, one or more blank lines are added above and below the line currently being read. Once the characters of the text have been altered, the altered text can be displayed. The text can be displayed on the display of a computing device, such as but not limited to, e-book readers, desktop computing devices, tablet computing devices, personal digital assistants, telephones, cell phones, notebook computing devices, etc.

The location of an observer's gaze location can be continuously monitored while reading the text. The location of the nominal span can change based upon the observer's gaze location. For example, the nominal span can be always centered on the observer's gaze location. In one implementation, the location of the nominal span is changed based upon the observer's gaze location moving along a line of text. For example, once the gaze location has moved beyond a predetermined tolerance threshold, the nominal span location can be updated. The nominal span location can be updated such that the nominal span is centered on the current gaze location. The characters of the text can also be continuously altered based upon the location of the nominal span. Accordingly, the characters within the text will change based upon the observer's current gaze location as the text is read.

As the characters within the text change based upon the gaze location, unwanted jitter can occur. Jitter can occur for instance if the gaze location changed rapidly from two lines of characters. If this occurs, the nominal span and the alterations of the characters would switch back and forth between the two lines. Jitter can be reduced based upon the flow of the language being read. For example, in English text is read from left to right and top to bottom. Jitter can be reduced by not allowing the nominal span to move backwards in the flow of text. For example, jitter can be reduced by not allowing the nominal span to advance to the next line of text until the nominal span reach the end or near the end of the current line of text. In addition, jitter can be reduced by not allowing the nominal span to move to a previous line of text. In addition, the nominal span can be required not to skip any unread words. For example, if a new gaze location was calculated to be three lines further in the text, this gaze location can be ignored. To allow a user to skip ahead or reread a previous portion of text, a user can provide an input that allows the nominal span to move backwards or skip ahead. For example, a user can select a nominal span unlock icon, look at a nominal span unlock icon, or look at a particular point of the document for a predetermined period of time, etc. As a more detailed example, a user can skip ahead in text by looking at text for a predetermine span of time, such as 2 seconds, 3 seconds, 5 seconds, etc. Once the gaze location has not changed for the predetermined amount of time, the nominal span can be moved to the gaze location.

The movement of the nominal span can be recorded as the text (or other image) is viewed. This movement can be compared to known reading speeds/patterns to ensure that an image was in fact viewed in its entirety.

Figure 3:
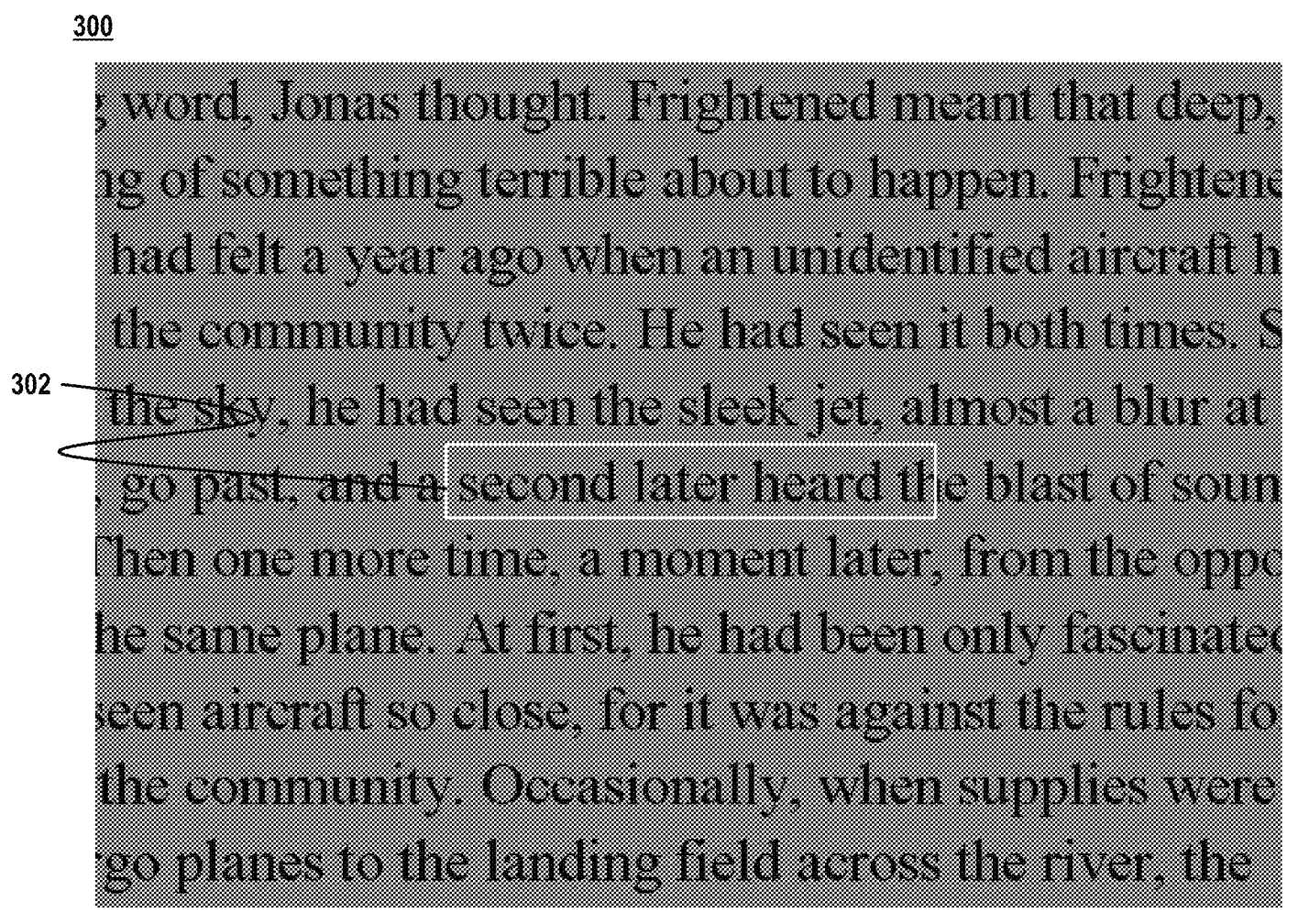

Altering visual characteristics of characters within the text reduces the crowding of the characters outside of the nominal span. The reduction of crowding can increase an observer's visual span. FIG. 3 illustrates unaltered characters of text. In the illustrated text 300, the visual characteristics of the characters are the same. For example, the background color is gray and the font color is black, while the font type and the font size are constant across the characters. A nominal span 302 without any alterations to the visual characteristics can be difficult to read. The border around the nominal span 302 is for illustrative purposes only and is not part of the displayed text. The observer, therefore, does not see a box around the nominal span 302.

Alterations to the text based upon the nominal span can be modified using a user interface. Using the user interface, an observer or another user can select how characters within and outside of the nominal span are to be altered. In addition, the amount of text that is displayed is configurable. For example, a user can choose to display a page, a paragraph, or a line at a time. Once the user reaches the end of the displayed text, the next portion of text is displayed based upon the preferences associated with the observer.

The text can be in numerous formats/encodings. For example, the text can be ASCII encoded text or text within a word processing document. In another embodiment, the text can be located within an image. Characters within the text can be identified and the characters of the text can be modified as described above in respect to a nominal span. In addition to characters, objects within an image can be modified based upon a gaze location. For example, an area in an image around a gaze location can be modified. For example, the area can be magnified, the contrast can be changed, etc. In addition or alternatively, the area in the image outside of the area can be changed. For example, the area can be changed to black and white, can be blurred, the contrast can be altered, etc.

In another implementation, a component of text can be altered to increase attention to the component. A component can be, but is not limited to, a word, a syllable, a phrase, etc. For example, a reading program can alter a syllable of a word that is currently being read. The current syllable can be deduced from the gaze location in a similar manner as determining the location of a visual span within text. Instead, however, of a visual span, the current gaze location is used to determine a location in text. This location in the text can then be used to determine where in a particular word a user is looking. The location and the word can then be used to determine what syllable the user is viewing. The visual characteristics of the characters in the current syllable can then be altered to increase the observer's attention to the syllable. For example, the syllable can be highlighted and/or have its size increased. In addition or alternatively, the characters that are not part of the current syllable can be changed. For example, the color of these characters, size, background color, etc., can be changed.

Figure 4:
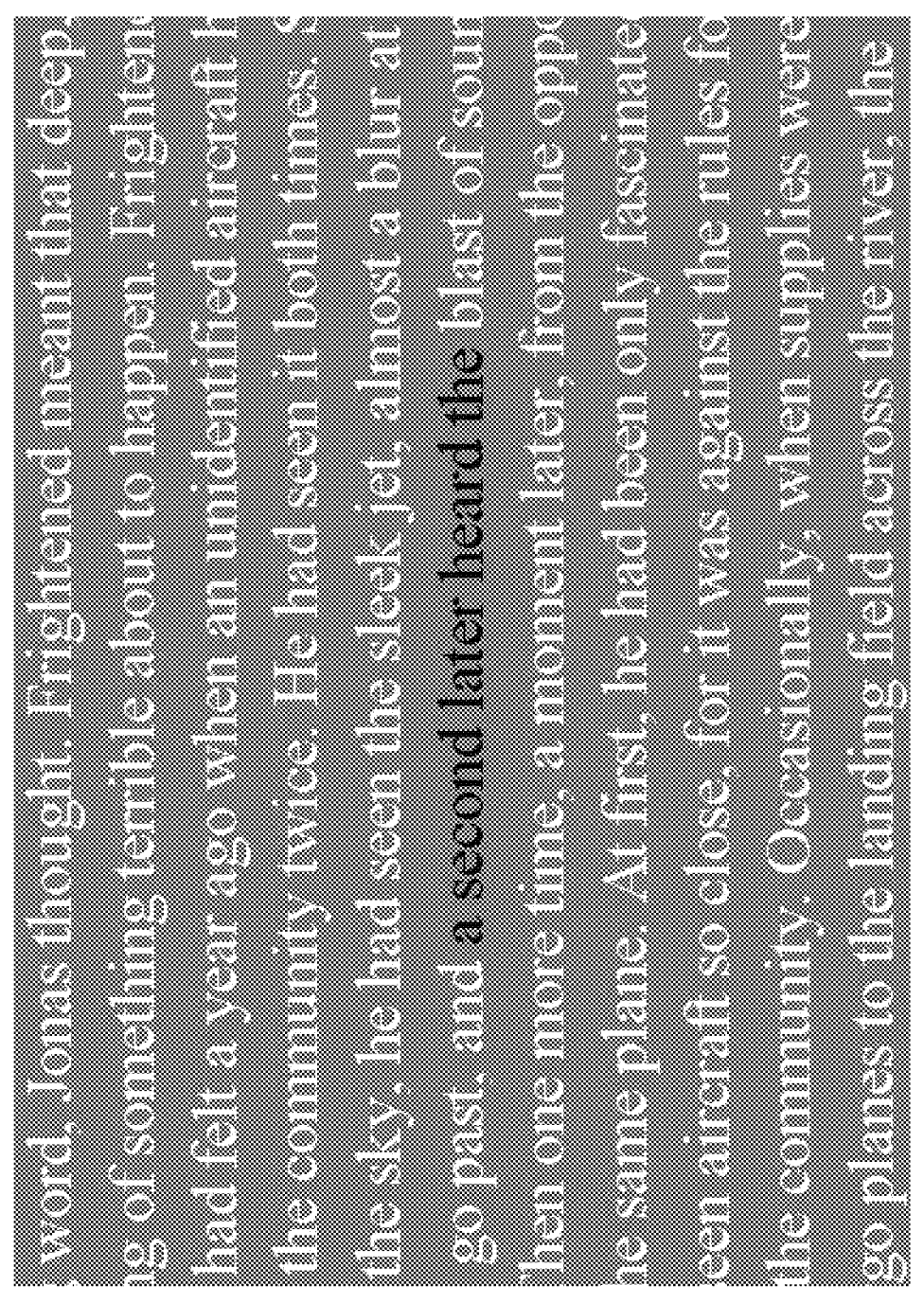
Figure 5:
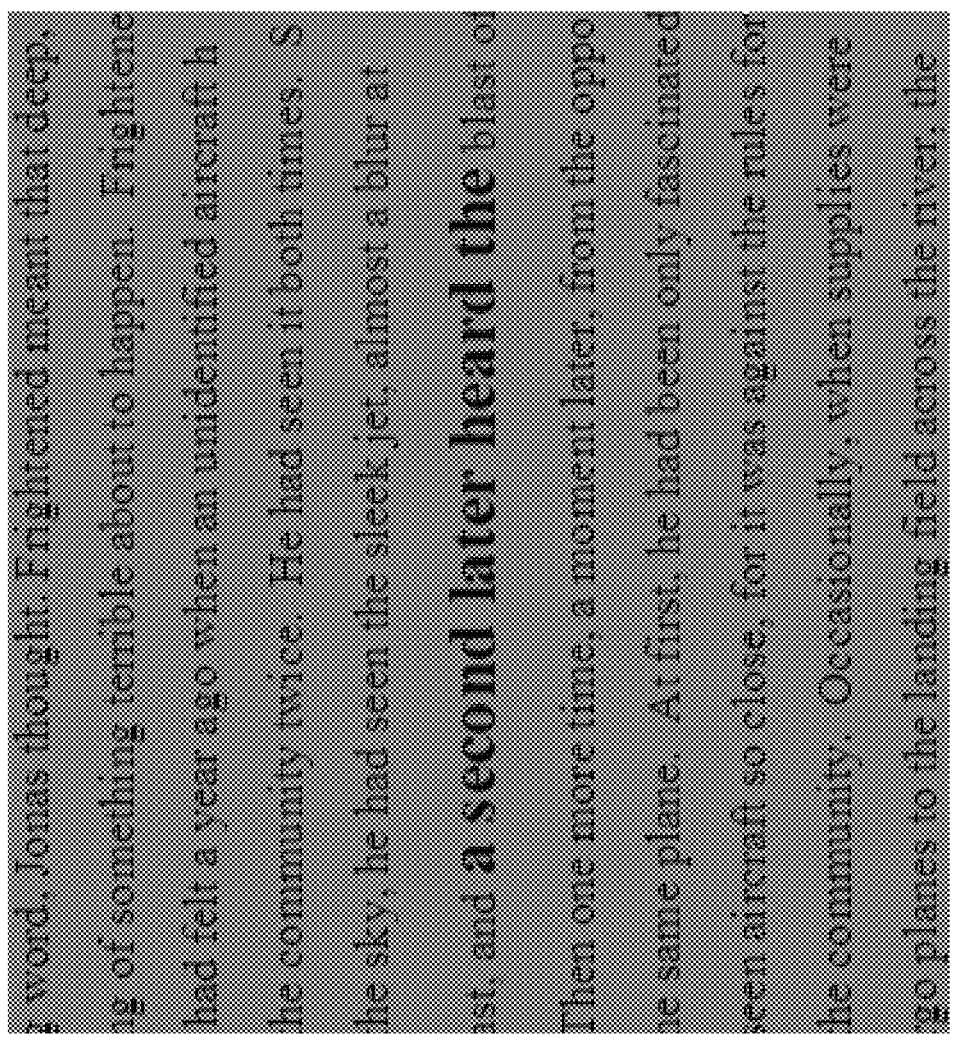
FIG. 5 illustrates altering size of characters to reduce crowding and increase attention in accordance with an illustrative implementation.
Figure 6:
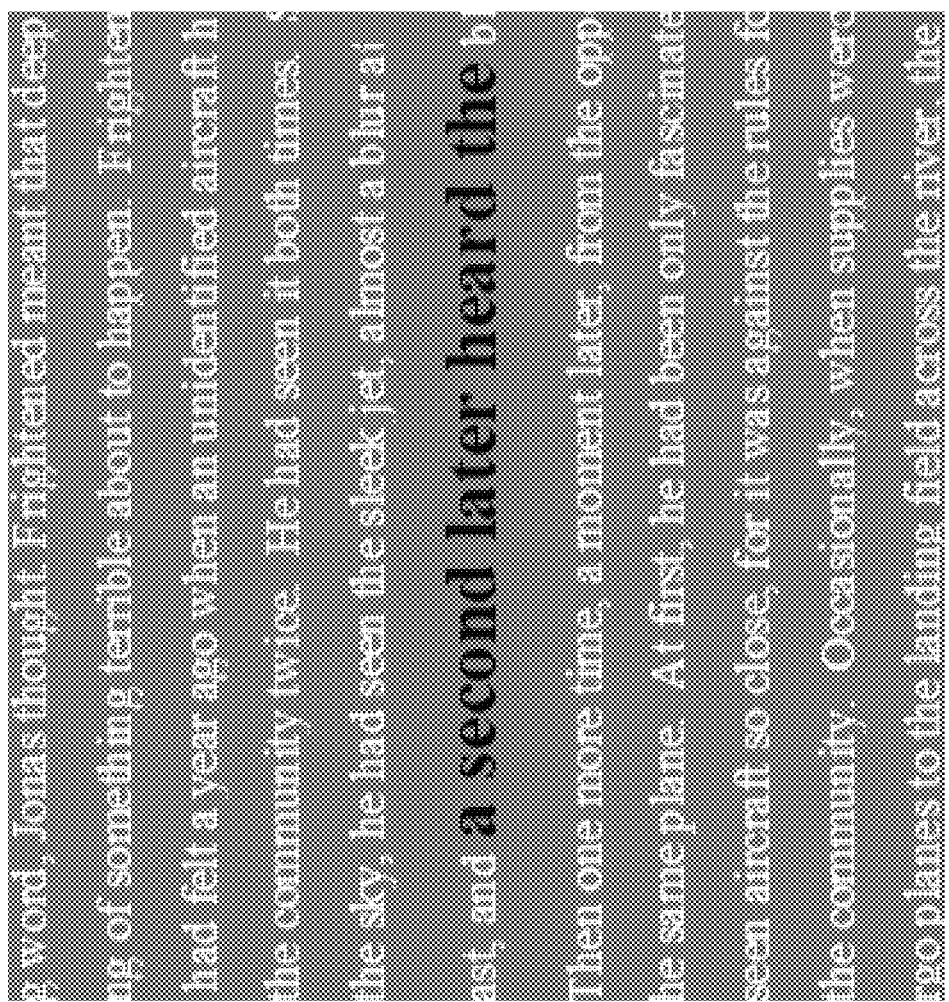
FIG. 6 illustrates altering character color and size to reduce crowding and increase attention in accordance with an illustrative implementation.

In one implementation, a gaze contingent display, for example display 108, can display altered characters in text that are being viewed by an observer. FIGS. 4, 5, and 6 illustrate examples of altered characters in text in accordance with illustrative implementations. In FIG. 4, the characters within the nominal span and immediately to the left and right of the nominal span 302 have a different color compared to the other characters. Other visual characteristics can be altered. FIG. 5 illustrates altering the size of characters to reduce crowding. In one implementation, the characters within and immediately to the left and right of the nominal span 302 can have an increased size compared to the other characters. The size of the other characters can also have their sizes reduced to further increase the difference in sizes between the characters. Multiple visual characteristics can be altered to reduce the crowding of characters within the displayed text. FIG. 6 illustrates altering color and size to reduce crowding in accordance with an illustrative implementation. In addition to the illustrated examples, other visual characteristics can be altered to reduce crowding. For example, the foreground and background colors can be altered to reduce the contrast of characters outside the visual span. Such changes in visual characteristics of characters decrease crowding and increase the visual span of an observer. As the viewing span is increased in size, the reading speed of an observer can also increase.

EXAMPLES

The present gaze contingent display and methods can be understood more readily by reference to the following example, which is provided by way of illustration and is not intended to be limiting in any way.

Example 1: Altering Text within and Beyond the Nominal Span

Five observers were shown paragraphs of text on a gaze contingent display. Their gaze was tracked (continuously measured). Observers were asked to silently read the paragraphs as quickly as possible while maintaining comprehension. The amount of simultaneously altered characters was varied. In the control condition (indicated on the plot by '0') observers were shown black text on a gray background. The text was not altered while the observer read the paragraph. The control condition corresponds to an observer's normal visual span.

Figure 7:
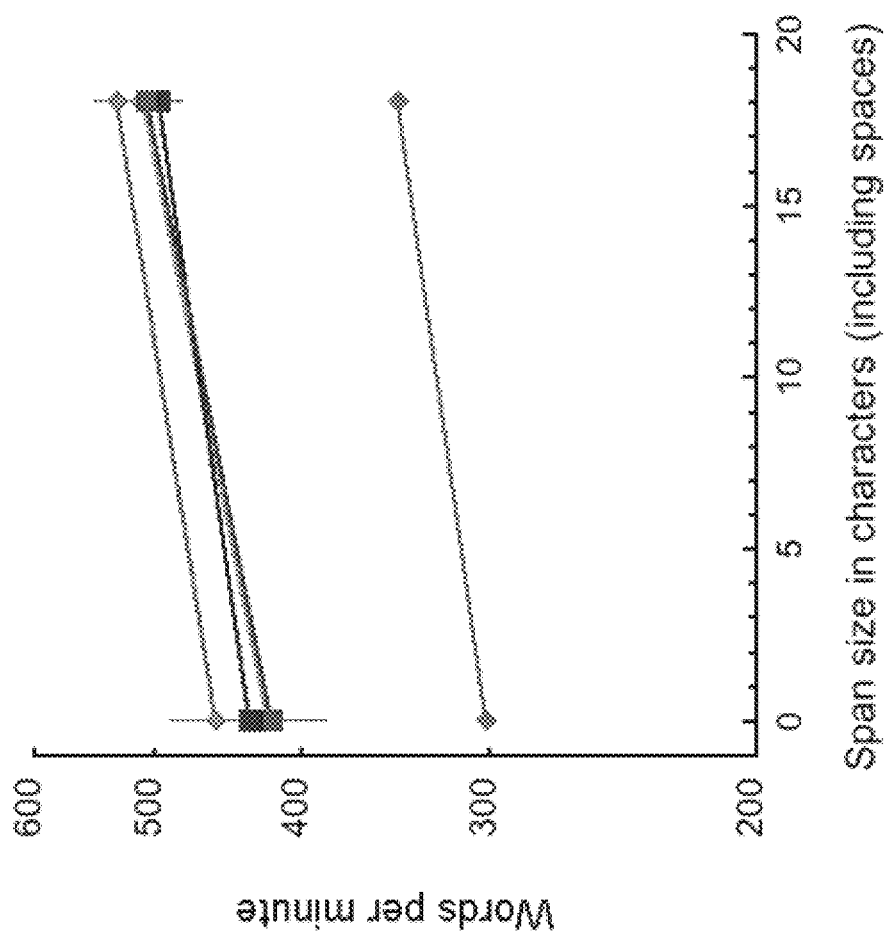
FIG. 7 illustrates the reading speed of five observers in accordance with an illustrative implementation.

The background was gray. In test conditions, most of the text was white except for the length of simultaneously altered characters, where the text was black. This change is similar to the change illustrated in FIG. 4. Each observer was tested on 4 trials of each condition. Trials and text content were randomly intermixed. No observer ever read the same text more than once. The amount of time required for the observer to read each paragraph was measured. Based upon the number of words within a paragraph, the reading speed of each observer was measured for each condition. Reading speeds increased in the test condition, compared to the control condition. FIG. 7 illustrates the reading speed of five observers (each plotted separately) as a function of span size: 0 and 18. The unmodified paragraph corresponds to zero altered characters. All observers increased their reading speed when 18 characters at a time were altered.

Example 2: Reading Speed as a Function of Span Size

There may be no single optimal visual span size across observers. Five observers were shown paragraphs of text on a computer display. Their gaze was continuously measured. Observers were asked to silently read the paragraphs as quickly as possible while maintaining comprehension. The number of simultaneously altered characters was varied. In the control condition (indicated on the plot by '0') observers were shown black text on a gray background. The text was not altered while the observer read the paragraph. The control condition corresponds to an observer's normal visual span.

Figure 8:
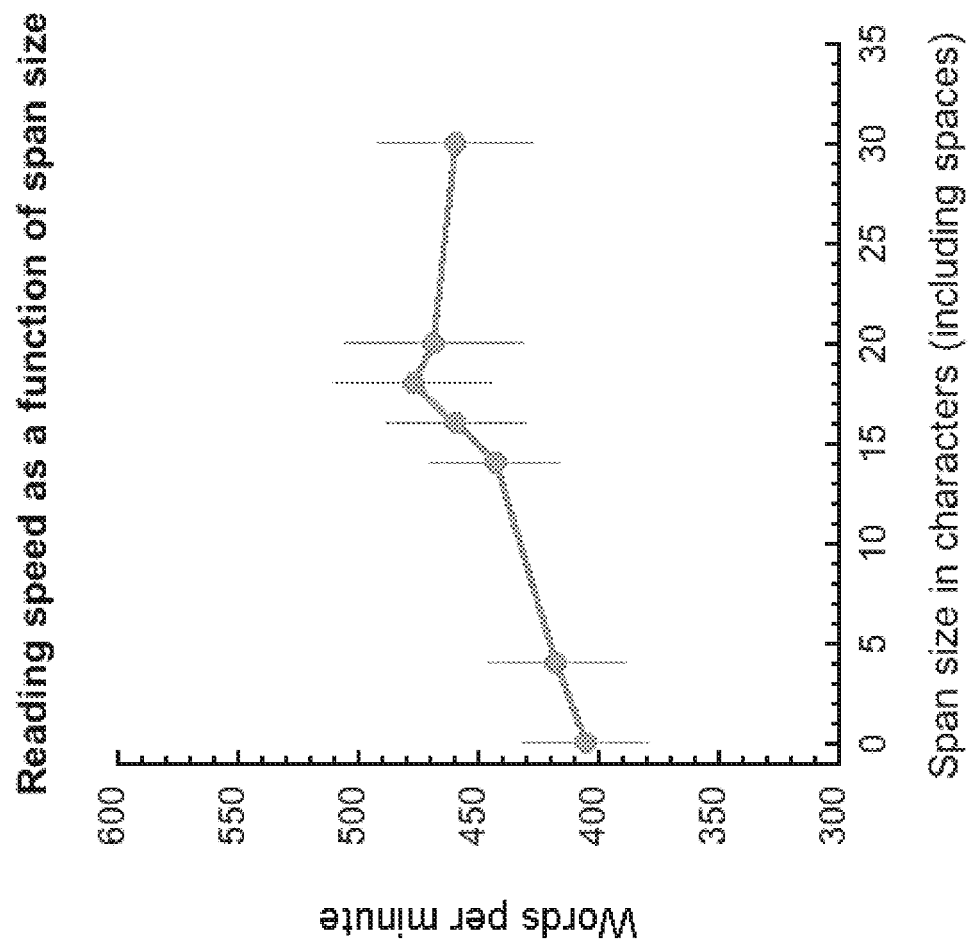
FIG. 8 illustrates the reading speed of five observers measured for varying lengths of simultaneously altered characters in accordance with illustrative implementations.

Several span sizes of characters were tested: 4, 14, 16, 18, 20 and 30. Each observer was tested on 4 trials of each condition. Trials and text content were randomly intermixed. No observer read the same text twice. The amount of time required for the observer to read each paragraph was measured. Based upon the number of words within a paragraph, the reading speed of each observer was measured for each condition. Reading speeds increased with span size, up to a span size of 18, and then decreased. FIG. 8 shows the average reading speed of all 5 observers as a function of span size. The control condition corresponds to zero altered characters, i.e., ordinary reading. Each observer has an optimal span.

Example 3: Various Changes to Visual Characteristics

Figure 9:
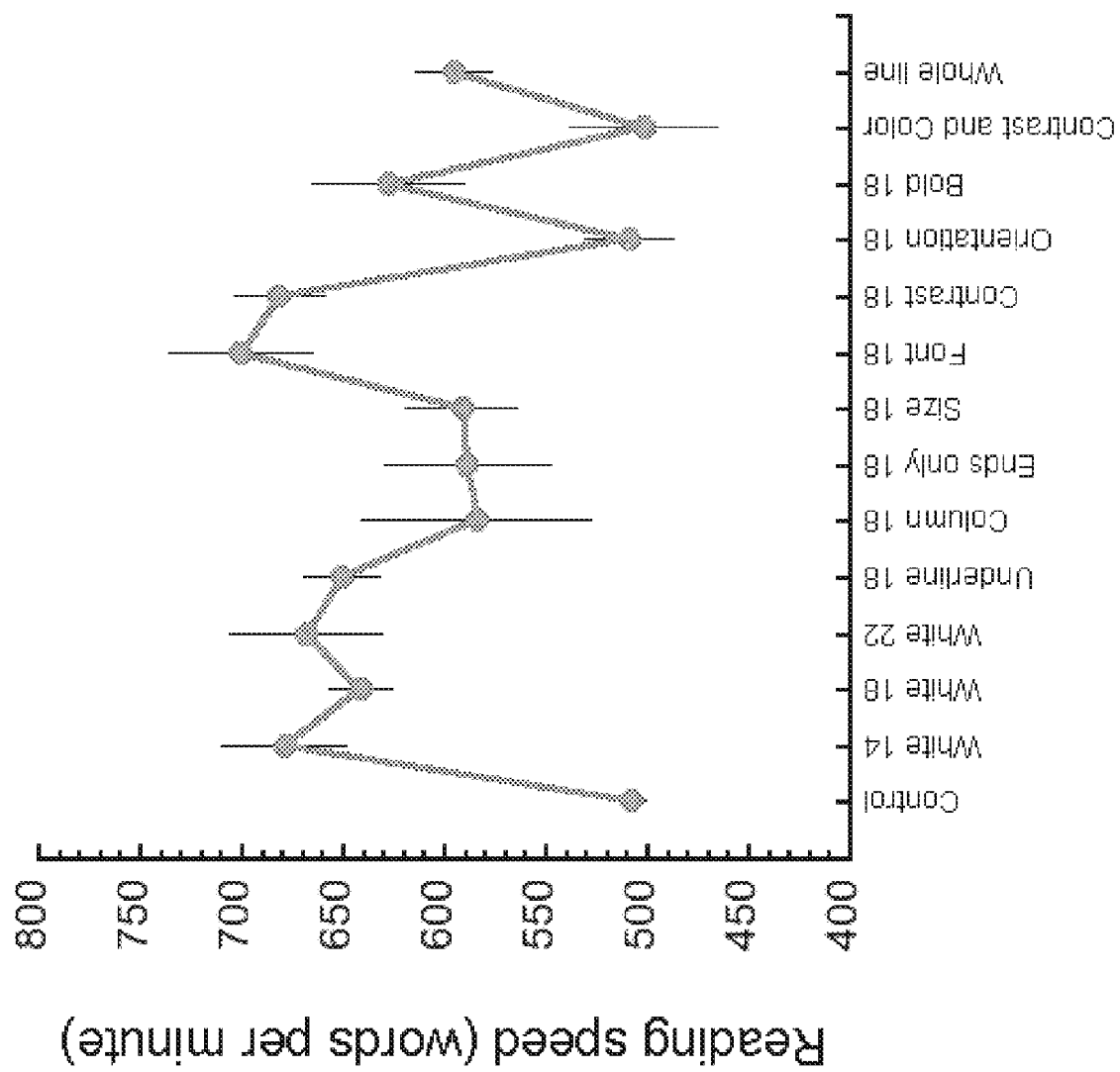
FIG. 9 illustrates changes to various visual characteristics of characters and the resulting changes in reading speed based on a single observer in accordance with illustrative implementations.

Crowding can be decreased and/or attention increased by changing one or more visual characteristics of characters within text. FIG. 9 illustrates changes to various visual characteristics of characters and the resulting changes in reading speed for one observer. The observer silently read 56 paragraphs (4 for each of 14 conditions) as quickly as possible, while maintaining comprehension. Span sizes and alterations to visual characteristics of the text were varied. In all conditions, all of the altered characters were 8 point, black, Times New Roman. In this way, only the background text was altered among conditions. In the control condition (indicated on the plot by '0') the observer was shown black text on a gray background. The text was not altered while the observer read the paragraph.

We tested black text within a span size 14 on a white background, black text within a span size 18 on a white background, black text within a span size 22 on a white background, black underlined text within a span size 18 on a black background, an entire black column of text within a span size 18 on a white background (so a column the height of text, and the width of the span that moved left and right with gaze position), black text within a span size 18 on a black background with white characters on each end of the span size (to separate the span group from the background), black text size 8 point font within a span size 18 on a black size 4 point font background, black Times New Roman font text within a span size 18 on a black Walkway SemiBold font background, black high contrast (100%) text within a span size 18 on a black low contrast (40%) background, black text within a span size 18 on a black italicized background, black text within a \span size 18 on a black bold background, black text within a span size 18 with an additional white span of 4 (totaling a span of 22) on a black low contrast (40%) background, and black text within a span the size of the entire line length on a white background (so the entire line of text being read is black).

Computing Devices

Figure 10:
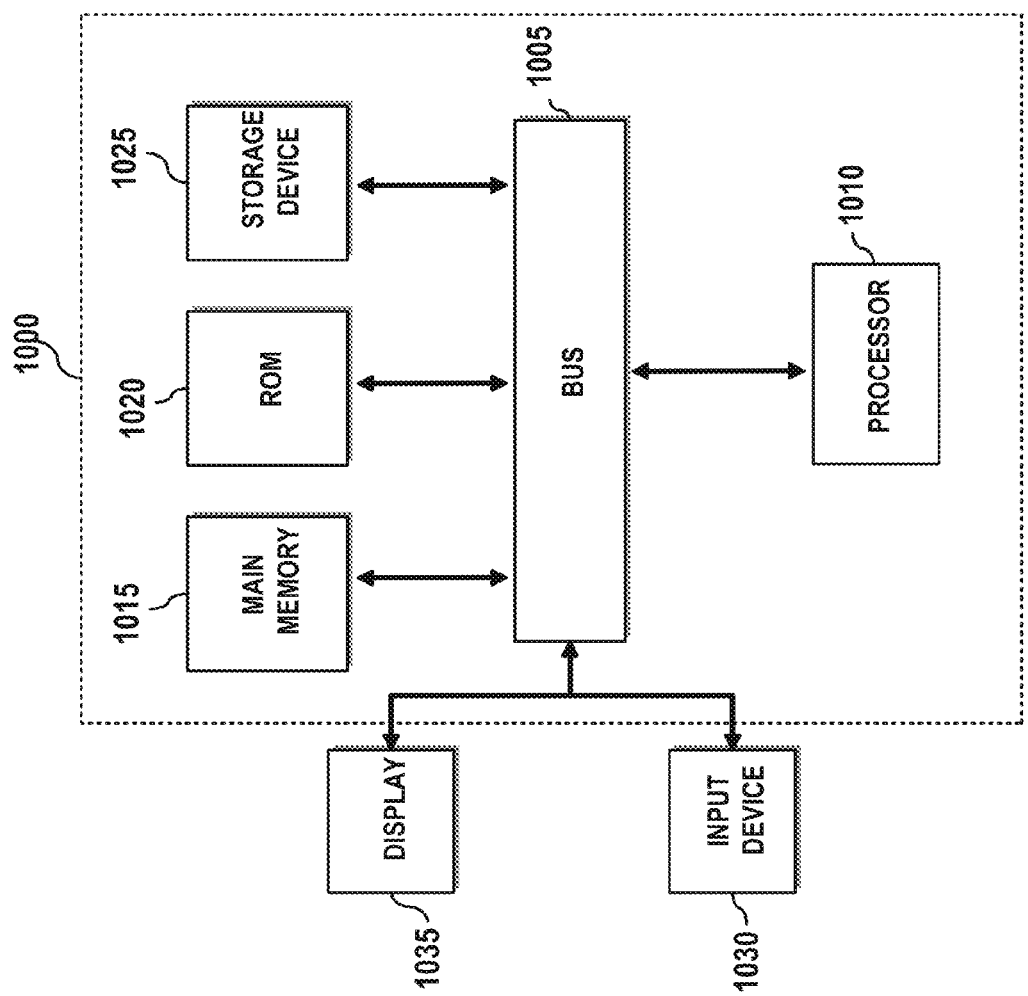
FIG. 10 is a block diagram of a computer system in accordance with an illustrative implementation.

FIG. 10 is a block diagram of a computer system in accordance with an illustrative implementation. The computer system or computing device 1000 can be used to implement a device that includes the processor 106 and the display 108, the gaze capture component 104, etc. The computing system 1000 includes a bus 1005 or other communication component for communicating information and a processor 1010 or processing circuit coupled to the bus 1005 for processing information. The computing system 1000 can also include one or more processors 1010 or processing circuits coupled to the bus for processing information. The computing system 1000 also includes main memory 1015, such as a random access memory (RAM) or other dynamic storage device, coupled to the bus 1005 for storing information, and instructions to be executed by the processor 1010. Main memory 1015 can also be used for storing position information, temporary variables, or other intermediate information during execution of instructions by the processor 1010. The computing system 1000 may further include a read only memory (ROM) 1010 or other static storage device coupled to the bus 1005 for storing static information and instructions for the processor 1010. A storage device 1025, such as a solid state device, magnetic disk or optical disk, is coupled to the bus 1005 for persistently storing information and instructions.

The computing system 1000 may be coupled via the bus 1005 to a display 1035, such as a liquid crystal display, or active matrix display, for displaying information to a user. An input device 1030, such as a keyboard including alphanumeric and other keys, may be coupled to the bus 1005 for communicating information and command selections to the processor 1010. In another implementation, the input device 1030 has a touch screen display 1035. The input device 1030 can include a cursor control, such as a mouse, a trackball, or cursor direction keys, for communicating direction information and command selections to the processor 1010 and for controlling cursor movement on the display 1035.

According to various implementations, the processes described herein can be implemented by the computing system 1000 in response to the processor 1010 executing an arrangement of instructions contained in main memory 1015. Such instructions can be read into main memory 1015 from another computer-readable medium, such as the storage device 1025. Execution of the arrangement of instructions contained in main memory 1015 causes the computing system 1000 to perform the illustrative processes described herein. One or more processors in a multi-processing arrangement may also be employed to execute the instructions contained in main memory 1015. In alternative implementations, hard-wired circuitry may be used in place of or in combination with software instructions to effect illustrative implementations. Thus, implementations are not limited to any specific combination of hardware circuitry and software.

Although an example computing system has been described in FIG. 10, implementations of the observer matter and the functional operations described in this specification can be implemented in other types of digital electronic circuitry, or in computer software, firmware, or hardware, including the structures disclosed in this specification and their structural equivalents, or in combinations of one or more of them.

Implementations of the observer matter and the operations described in this specification can be implemented in digital electronic circuitry, or in computer software, firmware, or hardware, including the structures disclosed in this specification and their structural equivalents, or in combinations of one or more of them. The observer matter described in this specification can be implemented as one or more computer programs, i.e., one or more modules of computer program instructions, encoded on one or more computer storage media for execution by, or to control the operation of, data processing apparatus. Alternatively or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, or other storage devices). Accordingly, the computer storage medium is both tangible and non-transitory.

The operations described in this specification can be performed by a data processing apparatus on data stored on one or more computer-readable storage devices or received from other sources.

The term "data processing apparatus" or "computing device" encompasses all kinds of apparatus, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the observer matter described in this specification can be implemented on a computer having a display device, e.g., a CRT (cathode ray tube), LCD (liquid crystal display) monitor, or LED (light emitting diode) monitor, for displaying information to the user and a keyboard and a pointing device, e.g., a mouse, a trackball, or a touchpad, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

While this specification contains many specific implementation details, these should not be construed as limitations on the scope of any inventions or of what may be claimed, but rather as descriptions of features specific to particular implementations of particular inventions. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated in a single software product or packaged into multiple software products.

Thus, particular implementations of the observer matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A system comprising: a gaze capture component configured to:
   capture an image that comprises a representation of at least one eye of an observer;
   a processor configured to:
   determine location of the eyes of the observer in the image; calculate a gaze location based at least upon the location of the eyes in the image, wherein the gaze location identifies a location within text displayed on a display;
   estimate a nominal span, wherein a location of the nominal span is based upon the gaze location, and wherein the nominal span comprises a plurality of characters;
   alter one or more first visual characteristics of the plurality of characters by changing a color of the plurality of characters within the nominal span and to the left and right of the nominal span to a first color; and
   alter one or more second visual characteristics of characters outside of the nominal span by changing a color of the characters outside of the nominal span to a second color, wherein the first color and the second color are different.

2. The system of claim 1, wherein the alterations to the one or more visual characteristics of the displayed text increase attention.

3. The system of claim 1, further comprising the display configured to display the altered text.

4. The system of claim 1, wherein the processor is configured to determine the nominal span by measuring a visual span size of an observer.

5. The system of claim 1, wherein a size of the nominal span is based upon an average visual span size of a population of observers.

6. The system of claim 1, wherein the processor is configured to alter the first visual characteristics of characters by changing a size of the plurality of characters within the nominal span and to the left and right of the nominal span.

7. The system of claim 6, wherein the processor is configured to alter the second visual characteristics of characters by changing a size of the outside of the nominal span.

8. The system of claim 1, wherein the alterations of the one or more visual characteristics of the displayed text increases saliency compared to unaltered displayed text.

9. A method comprising:
   capturing an image that comprises a visual representation of at least one eye of an observer; determining location of the eyes of the observer in the image;
   calculating a gaze location based at least upon the location of the eyes in the image, wherein the gaze location identifies a location within displayed text;
   estimating a nominal span, wherein a location of the nominal span is based upon the gaze location, and wherein the nominal span comprises a plurality of characters;
   altering one or more first visual characteristics of the plurality of characters by changing a color of the plurality of characters within the nominal span and to the left and right of the nominal span to a first color; and
   altering one or more second visual characteristics of characters outside of the nominal span by changing a color of the characters outside of the nominal span to a second color, wherein the first color and the second color are different.

10. The method of claim 9, wherein the alterations to the one or more visual characteristics of the displayed text increase attention.

11. The method of claim 9, further comprising displaying the altered text.

12. A non-transitory computer-readable medium having instructions stored thereon, the instructions comprising:
    instructions to receive a gaze location, wherein the gaze location identifies a location on a display of a user;
    instructions to map the gaze location to a location within text displayed on the display;
    instructions to estimate a nominal span, wherein a location of the nominal span is based upon the gaze location, and wherein the nominal span comprises a plurality of characters;
    instructions to alter one or more first visual characteristics of the plurality of characters by changing a color of the plurality of characters within the nominal span and to the left and right of the nominal span to a first color; and
    instructions to alter one or more second visual characteristics of characters outside of the nominal span by changing a color of the characters outside of the nominal span to a second color, wherein the first color and the second color are different.

13. A system comprising:
    a gaze capture component configured to capture gaze information; a processor configured to:
    determine a gaze location based on the gaze information from the gaze capture component, wherein the gaze location identifies a location within text displayed on a display;

estimate a nominal span, wherein a location of the nominal span is based upon the gaze location, and wherein the nominal span comprises a plurality of characters; and alter one or more first visual characteristics of the plurality of characters by changing a color of the plurality of characters within the nominal span and to the left and right of the nominal span to a first color; and alter one or more second visual characteristics of characters outside of the nominal span by changing a color of the characters outside of the nominal span to a second color, wherein the first color and the second color are different.

14. The system of claim 13, wherein a size of the nominal span is based upon an average visual span size of a population of observers.

15. The system of claim 13, wherein the alteration to the one or more visual characteristics of the displayed text increase attention to the displayed text in and to the left and right of the nominal span.

16. The system of claim 13, wherein the processor is configured to determine the nominal span by measuring a visual span size of an observer.

17. The system of claim 13, wherein the processor is configured to alter the first visual characteristics of characters by changing a size of the plurality of characters within the nominal span and to the left and right of the nominal span.

* * * * *

UNITED STATES PATENT AND TRADEMARK OFFICE
CERTIFICATE OF CORRECTION

Page 1 of 1

PATENT NO. : 9,672,788 B2
APPLICATION NO. : 14/352869
DATED : June 6, 2017
INVENTOR(S) : Sarah Rosen et al.

It is certified that error appears in the above-identified patent and that said Letters Patent is hereby corrected as shown below:

In the Specification

In Column 1, Line 18, replace "R01 EY04432" with -- R01 EY004432 --

Signed and Sealed this
Seventeenth Day of March, 2020

Andrei Iancu
*Director of the United States Patent and Trademark Office*